June 13, 1961  R. WESTBURY  2,988,307
FLYING CONTROL SYSTEMS FOR AIRCRAFT
Filed Nov. 26, 1958  3 Sheets-Sheet 1

Inventor
Roy Westbury
By Moses, Nolte & Nolte
Attorneys

United States Patent Office 2,988,307
Patented June 13, 1961

2,988,307
FLYING CONTROL SYSTEMS FOR AIRCRAFT
Roy Westbury, Bridgnorth, England, assignor to H. M. Hobson Limited, London, England, a company of Great Britain
Filed Nov. 26, 1958, Ser. No. 776,634
3 Claims. (Cl. 244—85)

In order to obtain the required degree of safety in operation, it is desirable to split each of the control surfaces of an aircraft fitted with power operated control surfaces into a number of sections because loss of control on any one section of a control surface will not then jeopardise the safety of the aircraft. The minimum number of surface sections to each axis of control is of course two, i.e. two ailerons (which is normal in any case), two elevator sections and two rudder sections. The number of sections may, however, be increased as desired.

One of the principal reasons for dividing the control surfaces into a number of sections is that of covering the effects of a "run-away" servo control, following seizure of the control valve.

It is not, however, sufficient merely to divide the control surfaces of the aircraft in order to maintain effective aerodynamic control after a control surface section has failed in a displaced position. Even though the effect on the aircraft of runaway of the failed section could be cancelled by displacement of the other control surface section or sections, the increase of drag could nevertheless be such as to dangerously reduce the aircraft range. It is, therefore, necessary to ensure that the failed section is brought to a trailing position.

The invention provides, in an aircraft, the combination with a control surface split into two sections, of a pair of hydraulic actuators coupled to each section of the control surface, the control valves of the actuators of both pairs being coupled to a common pilot's control member by individual mechanical linkages each including, a normally inoperative lost motion connection permitting, in an emergency, movement of the linkage in either direction in relation to the control valve. Preferably each actuator includes a non-return valve in the pressure supply line to its control valve and a leakage path permitting of restricted flow of liquid in parallel to the non-return valve. Preferably also the actuators of each pair are supplied with liquid under pressure from independent sources.

Figure 1:
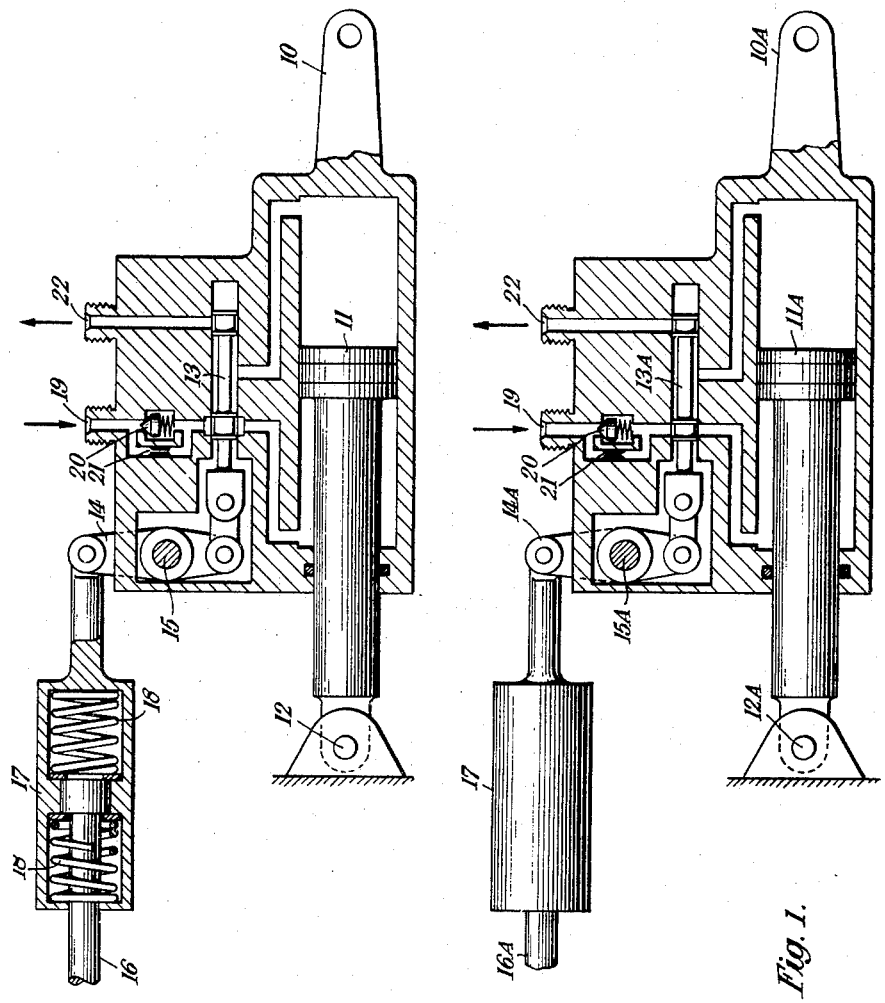
Figure 2:
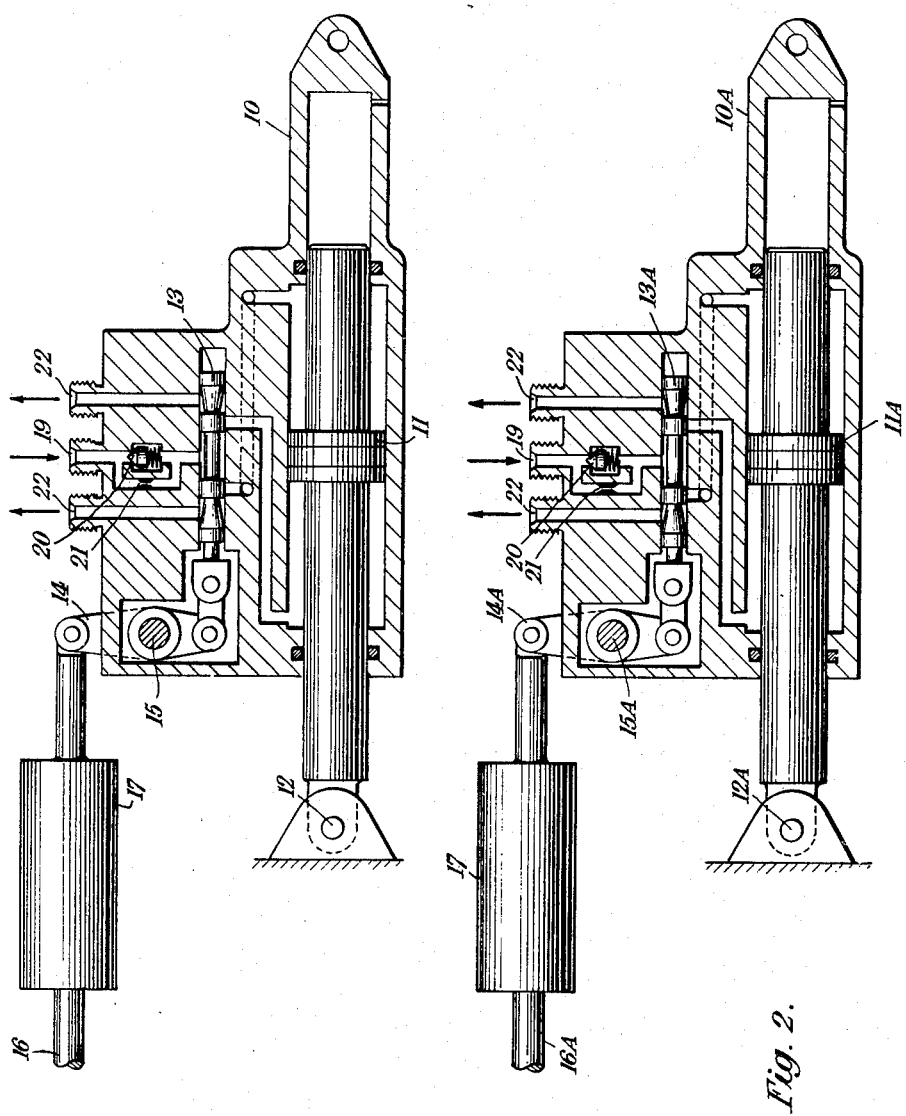
Figure 3:
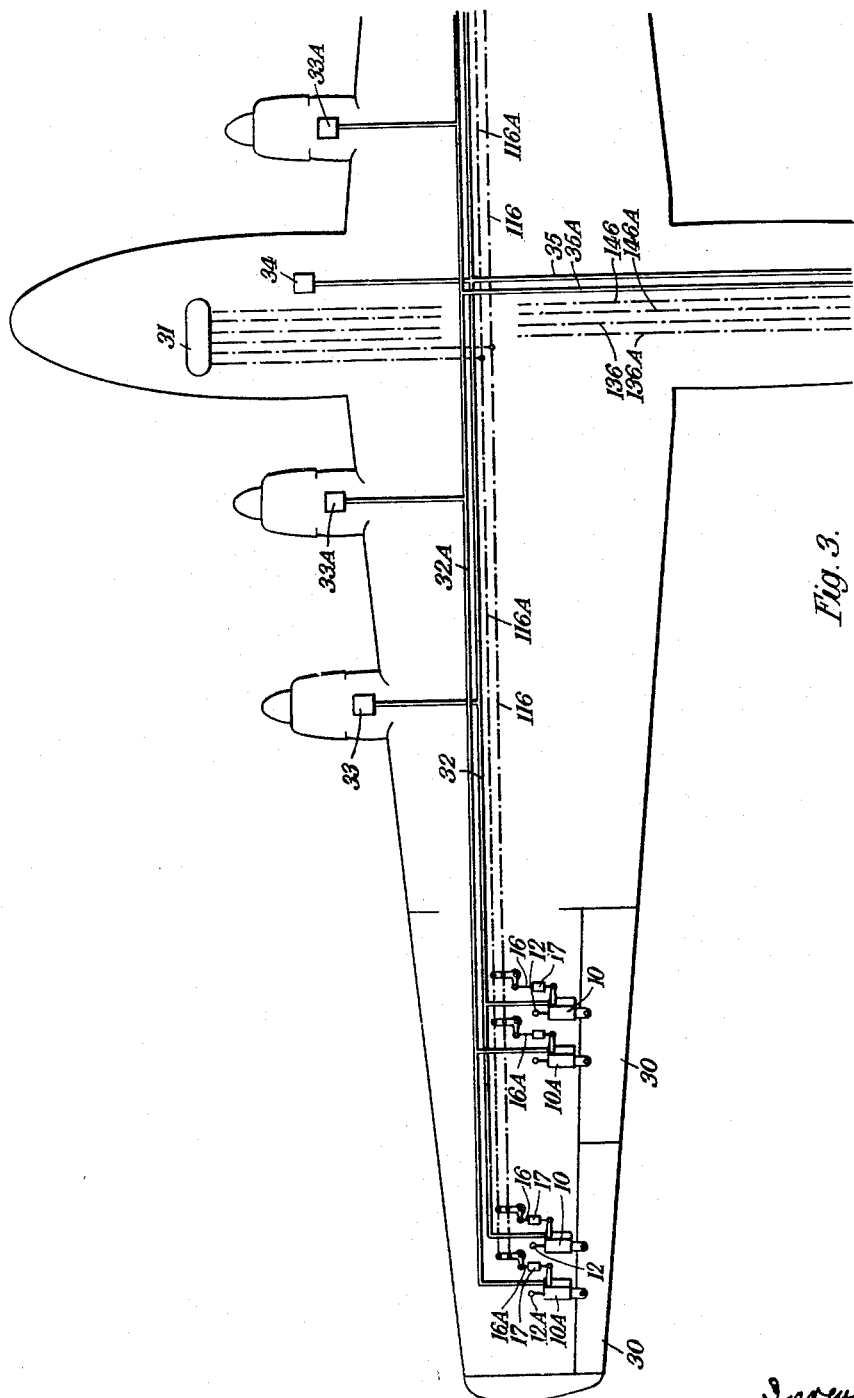

The invention will now be described in more detail, by way of example, with reference to the drawings in which:

FIG. 1 is a sectional view through the two jacks associated with one section of a control surface of an aircraft and having pistons of differential areas and a single exhaust outlet, FIG. 2 is a similar view of a slightly modified construction in which the jack pistons have the same areas at each side and in which the jacks have twin exhaust outlets, and FIG. 3 shows part of an aircraft fitted with the control system according to the invention.

Like reference numerals indicate like parts throughout the figures.

FIG. 3 shows the control system applied to one of the ailerons of the aircraft but it is to be understood that the other aileron, each rudder and the elevator are similarly controlled. Each aileron and rudder is split into two sections each controlled by a pair of hydraulic jacks. The elevator may, however, by split into four sections each controlled by a pair of hydraulic jacks.

As shown in FIG. 3, the aileron there illustrated is split into two control sections 30, each connected to the movable cylinders 10, 10A of a pair of hydraulic jacks, the pistons 11, 11A of which (Fig. 1) are pivoted at 12, 12A to a fixed portion of the aircraft structure. The control valves 13, 13A of the two jacks are connected, by levers 14, 14A pivoted to the respective jack cylinders at 15, 15A, to mechanical linkages 16, 16A connected to a common pilot's control member. Each of the linkages 16, 16A includes a spring box 17 containing a pair of preloaded springs 18.

As shown in FIG. 3, the linkages 16, 16A of both control surface sections 30 are connected to a common twin mechanical linkage 116, 116A, duplicate linkages 116, 116A being provided as a safeguard against linkage failure. The pilot's controls are indicated diagrammatically at 31 in FIG. 3 and include an aileron control operating on the jacks associated with both ailerons through the twin mechanical linkage 116, 116A, a rudder control acting on the jacks associated with both rudders through a twin mechanical linkage 136, 136A and an elevator control acting on the jacks associated with the elevator through a twin mechanical linkage 146, 146A.

Each jack has a pressure inlet 19, containing a non-return valve 20, in parallel with which is a leakage path through a restrictor 21. In FIG. 1, each jack has a single exhaust outlet 22, while in FIG. 2 each jack has twin exhaust outlets 22. The two jacks of each pair receive liquid under pressure from independent pressure sources. This ensures that the control surface section will not be disabled as the result of failure of a pressure source or jack seal leakage. Thus the inlets of the jacks 10 are connected to a line 32 (FIG. 3) to which pressure liquid is supplied by an engine-driven pump 33 and a pump 34 driven by an independent power unit, while the inlets of the jacks 10A are connected to a line 32A supplied with pressure liquid by engine driven pumps 33A. Similar connections are made from the pumps to the jacks associated with the rudder and elevators through lines 35, 35A.

Runaway of the servo control in the event of control valve seizure is prevented as follows. Assuming that the control valve 13 in the arrangement shown in FIG. 2 seizes when displaced to the left from the neutral position shown, the jack cylinder 10 will tend to run away towards the right. When the pilot brings the control member to rest, the tendency of the control surface section to run away will automatically be opposed by displacement in relation to the jack cylinder 10A of the control valve 13A in the reverse direction, i.e. to the right from the neutral position shown, this movement being permitted by yielding of the spring box 17 associated with the failed jack 10. The right hand end of the cylinder of jack 10 is then connected to pressure and its left hand end to exhaust, while reverse conditions apply in the case of the cylinder of the jack 10A. The pilot is thus able to select opposing motions of the two jacks which will result in a cancellation of servo forces and the development of zero effort at the control surface section or he can select similar motions of the control valves which will result in a normal selection of movement at the control surface section. The latter can, therefore, be moved in one direction as desired, but not in the reverse direction and it cannot run away. Despite the fact that the resultant hinge moment applied to the control surface section by the jacks is zero, the section is nevertheless subject to a centralizing aerodynamic hinge moment which tends to return it to a neutral or trailing position.

For suppression of flutter a stiff attachment for the control surface section is required in the absence of mass balance of the section. If the non-return valves 20 were not provided and the control surface is not mass-balanced (which is normally the case in order to save weight) an insufficiently stiff attachment for the control surface section would result since the two opposed jacks could move freely under the aerodynamic loading on the control surface section against the hydraulic supply, particularly when the pump supplying each jack supplies liquid under pressure to a hydraulic accumulator which is pneumatically loaded. The non-return valves 20, however, would apart from the leakage paths through the restrictors 21 lock the jacks positively against movement under the aerodynamic forces. The parallel leakage paths through the restrictors 21, however, permit of comparatively slow return of the control surface section to its trailing position under the aerodynamic forces while nevertheless providing adequate damping against flutter. This automatic return of the control surface section to its trailing position in, say, one minute will not result in an increase in drag sufficient to reduce appreciably the fuel consumed during a flight.

What I claim as my invention and desire to secure by Letters Patent is:

1. In a flying control system for aircraft comprising a control surface split into two individually movable sections each having separate actuating means and a pilot's control member for operating said actuating means, the improvement which consists in the provision of a pair of hydraulic actuators coupled to each of said sections of the control surface, each of said actuators including a cylinder and piston, one of which is fixed and the other of which is movable and connected to the control surface, a pressure supply passage, an exhaust passage, a control valve movable in opposite directions from a neutral position in which it cuts off both ends of the cylinder from said pressure supply passage and said exhaust passage to alternative flow-permitting positions in one of which it connects one end of the cylinder to said pressure supply passage and the other end of the cylinder to said exhaust passage and in the other of which said connections between the ends of the cylinder and said passages are reversed, a non-return valve in said pressure supply passage arranged to open in the direction to allow flow of liquid through said passage to said control valve, and a leakage channel connecting the portions of the pressure supply passage on opposite sides of said non-return valve and permitting of restricted flow of liquid through said pressure supply passage in the direction away from said control valve, and an individual mechanical linkage connecting the control valve of each of said actuators and the pilot's control member, each of said linkages including a normally inoperative lost motion connection permitting, in an emergency, movement of the linkage in both directions in relation to the control valve.

2. Apparatus as claimed in claim 1, wherein the actuators of each pair are supplied with liquid under pressure from independent sources.

3. Apparatus as claimed in claim 1, wherein said lost motion connections are spring boxes, each containing a pair of pre-loaded springs.

References Cited in the file of this patent

UNITED STATES PATENTS

| | | |
|---|---|---|
| 2,590,716 | Lisle | Mar. 25, 1952 |
| 2,609,165 | Hill | Sept. 2, 1952 |
| 2,619,304 | Feeney et al. | Nov. 25, 1952 |
| 2,751,751 | Strayer | June 26, 1956 |